(12) United States Patent
Tsuchiya et al.

(10) Patent No.: US 12,704,382 B2
(45) Date of Patent: Aug. 11, 2026

(54) VEHICLE STOP POSITION DETERMINATION SYSTEM AND VEHICLE STOP POSITION DETERMINATION METHOD

(71) Applicants: NISSAN NORTH AMERICA, INC., Franklin, TN (US); NISSAN MOTOR CO., LTD., Yokohama (JP)

(72) Inventors: Chikao Tsuchiya, Cupertino, CA (US); Kanako Sakai, Inagi (JP)

(73) Assignees: NISSAN NORTH AMERICA, INC., Franklin, TN (US); NISSAN MOTOR CO., LTD., Yokohama (JP)

( * ) Notice: Subject to any disclaimer, the term of this patent is extended or adjusted under 35 U.S.C. 154(b) by 111 days.

(21) Appl. No.: 18/618,356

(22) Filed: Mar. 27, 2024

(65) Prior Publication Data

US 2025/0305842 A1 Oct. 2, 2025

(51) Int. Cl.

| | |
|---|---|
| ***G01C 21/36*** | (2006.01) |
| ***G01C 21/00*** | (2006.01) |
| *B60W 30/18* | (2012.01) |

(52) U.S. Cl.

CPC ..... *G01C 21/3602* (2013.01); *G01C 21/3815* (2020.08); *B60W 30/18154* (2013.01); *B60W 2555/60* (2020.02); *B60W 2556/40* (2020.02)

(58) Field of Classification Search

CPC G01C 21/36; G01C 21/3602; G01C 21/3815; G01C 21/36; B60W 2555/60; B60W 2556/40; B60W 30/18154

USPC .......................................................... 701/450

See application file for complete search history.

(56) References Cited

U.S. PATENT DOCUMENTS

| | | | | |
|---|---|---|---|---|
| 2022/0274625 | A1* | 9/2022 | Garimella | G06N 3/04 |
| 2023/0054661 | A1* | 2/2023 | Murahashi | G06V 10/56 |
| 2023/0136710 | A1* | 5/2023 | Guberman | G06V 10/762 701/450 |
| 2024/0308543 | A1* | 9/2024 | Mizoguchi | B60W 60/001 |
| 2025/0303957 | A1* | 10/2025 | Tsuchiya | B60Q 1/507 |

* cited by examiner

*Primary Examiner* — Andrew Joseph Rudy
(74) *Attorney, Agent, or Firm* — Spencer Fane, LLP

(57) ABSTRACT

A vehicle stop position determination system includes an environmental sensor, a vehicle sensor and a processor. The environmental sensor is configured to detect traveling environment of a host vehicle to collect traveling environment data. The vehicle sensor is configured to detect driving status of the host vehicle to collect driving status data. The processor is configured to determine, as a stop position for a road intersection, a position of the host vehicle at a timing when the driving status data indicates that the host vehicle is stopping and the traveling environment data indicates a predetermined condition based on a relative position of the host vehicle relative to the road intersection.

17 Claims, 11 Drawing Sheets

VEHICLE STOP POSITION DETERMINATION SYSTEM AND VEHICLE STOP POSITION DETERMINATION METHOD

BACKGROUND

Technical Field

The present disclosure generally relates to a vehicle stop position determination system and a vehicle stop position determination method. More specifically, the present disclosure relates to a vehicle stop position determination system and a vehicle stop position determination method for determining a vehicle stop position.

Background Information

Autonomous driving systems are designed to execute all driving tasks without human intervention. Ensuring safety and navigation accuracy for these systems relies on the availability of accurate maps, particularly HD (High Definition) maps. These maps provide a detailed and realistic depiction of road structures, including stop lines, lane models, traffic signs, road furniture, and lane geometry.

Creating these maps with precise annotations of road structures typically demands significant human effort. For instance, road structures are often manually annotated using aerial or satellite images. Moreover, continuous updates to these maps are essential to maintain their relevance. Consequently, various techniques have been proposed to automate the extraction of road structures from images, either through image segmentation methods or automatic recognition using onboard sensor data.

SUMMARY

However, extracting or recognizing road structures from images can present challenges. For instance, stop lines may be difficult to extract due to occlusions caused by building shadows and trees in aerial or satellite images. Additionally, in some instances, stop lines may not be clearly painted on the road, hindering their recognition from onboard sensor data. Furthermore, during the autonomous driving, designating of stop positions within intersections for waiting for oncoming vehicles is necessary for a safe turn. However, stop lines are generally not painted inside intersections.

The present disclosure is directed to various features of a vehicle stop position determination system and a vehicle stop position determination method.

In view of the state of the known technology, one aspect of the present disclosure is to provide a vehicle stop position determination system comprising an environmental sensor, a vehicle sensor and a processor. The environmental sensor is configured to detect traveling environment of a host vehicle to collect traveling environment data. The vehicle sensor is configured to detect driving status of the host vehicle to collect driving status data. The processor is configured to determine, as a stop position for a road intersection, a position of the host vehicle at a timing when the driving status data indicates that the host vehicle is stopping and the traveling environment data indicates a predetermined condition based on a relative position of the host vehicle relative to the road intersection.

In view of the state of the known technology, another aspect of the present disclosure is to provide a vehicle stop position determination method comprising detecting, by an environmental sensor, traveling environment of a host vehicle to collect traveling environment data, detecting, by a vehicle sensor, driving status of the host vehicle to collect driving status data, and determining, by a processor, a position of the host vehicle at a timing when the driving status data indicates that the host vehicle is stopping and the traveling environment data indicates a predetermined condition based on a relative position of the host vehicle relative to a road intersection, as a stop position for the road intersection.

Also, other features, aspects and advantages of the disclosed vehicle stop position determination system and vehicle stop position determination method will become apparent to those skilled in the field of manufacturing vehicles from the following detailed description, which, taken in conjunction with the annexed drawings, discloses several illustrative embodiments of a vehicle with various features.

BRIEF DESCRIPTION OF THE DRAWINGS

Referring now to the attached drawings which form a part of this original disclosure.

Figure 1:
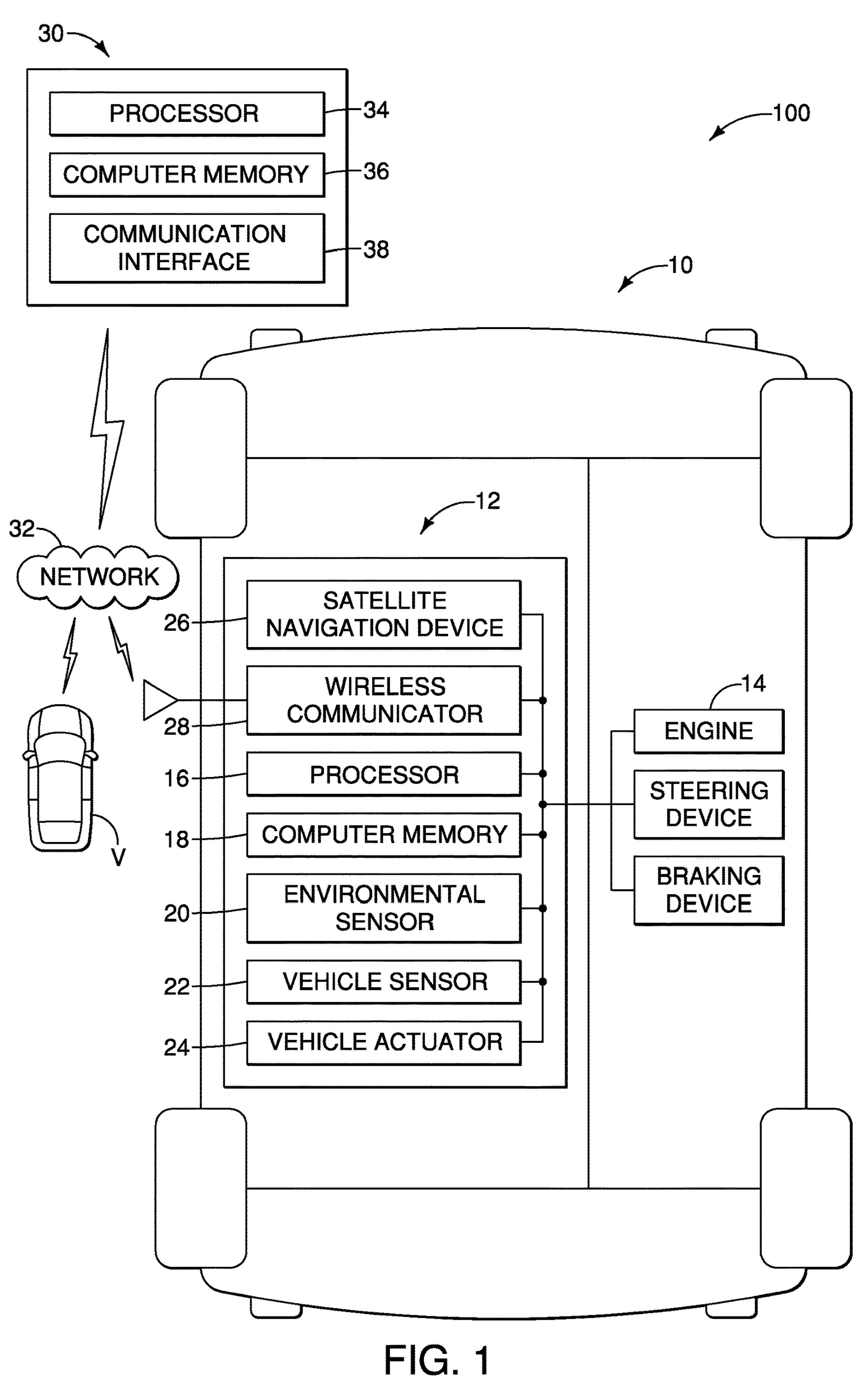
FIG. 1 is a schematic plan view of a map annotation system equipped with a vehicle and a remote server in accordance with an illustrated embodiment.

It should be noted that these figures are intended to illustrate the general characteristics of methods, structure and/or materials utilized in certain illustrative embodiments and to supplement the written description provided below. These drawings are not to scale and may not precisely reflect the precise structural or performance characteristics of any given embodiment, and should not be interpreted as defining or limiting the range of values or properties encompassed by illustrative embodiments unless specified. The use of similar or identical reference numbers in the various drawings is intended to indicate the presence of a similar or identical element or feature.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring to FIG. 1, a vehicle 10 (e.g., a host vehicle) according to one embodiment of the present disclosure will be described. In the illustrated embodiment, the vehicle 10 is provided to a map annotation system 100 (e.g., a vehicle stop position determination system), which will be discussed below. In the illustrated embodiment, the vehicle 10 is provided with a vehicle control system 12 that includes a driving support system that supports driving of the vehicle 10. The term "driving support system" as used herein may include an autonomous driving control and a driving assist control. The autonomous driving control performs all driving tasks without human intervention, such as automatically navigating the vehicle 10 along a planned route without human intervention. The driving assist control are designed assist the driver in a limited range of functions focused on specific driving tasks but still require human supervision and/or input. In the illustrated embodiment, an example is illustrated in which the driving support system is integrated with the vehicle control system 12. However, the driving support system can be a separate system from the vehicle control system 12 and be operated according to instructions or information from the vehicle control system 12. Furthermore, in the illustrated embodiment, an example is illustrated in which the vehicle control system 12 includes the driving support system. However, the vehicle control system 12 can be formed without the functions and the components solely utilized for the driving support system, as long as the vehicle control system 12 includes the functions and the components for the map annotation system 100, which will be discussed below. In this case, the vehicle control system 12 can serve as a telematics system with a vehicle tracking device that allows the sensing, receiving and storing of telemetry data, for example.

As also seen in FIG. 1, the vehicle 10 is also equipped with a vehicle engine 14 and other conventional vehicle components, such as a steering device, a braking device, etc. The vehicle engine 14 generates a torque output of the vehicle 10 in accordance with the operation of the vehicle pedal by the driver. The torque output generated by the vehicle engine 14 is then transferred to the wheels of the vehicle 10 through the transmission and the drivetrain of the vehicle 10 in a conventional manner. The vehicle engine 14 can be further equipped with an electronic control unit (ECM). In particular, the ECM controls a torque output of the vehicle engine 14. In the illustrated embodiment, the vehicle engine 14 includes an internal combustion engine. Alternatively, the vehicle 10 can be a hybrid or an electric vehicle, or be operated by a hydrogen powertrain.

In the illustrated embodiment, the vehicle 10 includes a processor or electronic controller 16. The processor 16 includes one or more processing units for controlling the various operations of the vehicle 10, as will be further described. In the illustrated embodiment, the processor 16 is preferably a microcomputer (MPU) or central processing unit (CPU). The processor 16 is formed of one or more semiconductor chips that are mounted on a circuit board. The term "processor" or "electronic controller" as used herein refers to hardware that executes a software program, and does not include a human being. The MPU or CPU may be one or more integrated circuits having firmware for causing the circuitry to complete the activities described herein. Of course, any number of other analog and/or digital components capable of performing the functionality described below can be provided in place of, or in conjunction with the processor 16.

In the illustrated embodiment, the vehicle 10 includes a computer memory 18. The computer memory 18 is any memory or storage device. Here, for example, the computer memory 18 includes a transitory or non-transitory computer-readable medium with the sole exception of a transitory propagating signal. Thus, the computer memory 18 can include nonvolatile memory and volatile memory, and can include at least one of an internal memory, or other type of memory devices such as a read-only memory (ROM), an erasable programmable read only memory (EPROM), an electrically erasable programmable read-only memory (EEPROM), a random access memory (RAM), a hard disk, a flash drive, etc. The computer memory 18 stores various control processes or control programs as well as information or data used by the processor 16. Thus, the computer memory 18 is electrically connected to the processor 16. In this way, the processor 16 can retrieve data and access programs stored in the computer memory 18, and can store data to the computer memory 18. As explained below, the computer memory 18 preferably includes non-volatile memory that is configured to store various control programs, operational data, component identification data, etc.

In the illustrated embodiment, the vehicle 10 includes an environmental sensor 20. The environmental sensor 20 detects traveling environment of the vehicle 10, as will be further discussed below. For example, the environmental sensor 20 can be equipped with one or more unidirectional or omnidirectional external cameras that take moving or still images of the traveling environment or surroundings of the vehicle 10. The environmental sensor 20 can also include infrared detectors, ultrasonic detectors, radar detectors, photoelectric detectors, magnetic detectors, acceleration detectors, acoustic/sonic detectors, gyroscopes, lasers or any combination thereof. The environmental sensor 20 can also include object-locating sensing devices including range detectors, such as FM-CW (Frequency Modulated Continuous Wave) radars, pulse and FSK (Frequency Shift Keying) radars, sonar and Lidar (Light Detection and Ranging) devices. The traveling environment of the vehicle 10 detected by the environmental sensor 20 can be used to collect traveling environment data, as will be further described below. In any case, in the illustrated embodiment, the environmental sensor 20 includes at least one of a lidar sensor (Lidar), a radar sensor (radar) and an image sensor (camera).

In the illustrated embodiment, the vehicle 10 includes a vehicle sensor 22. The vehicle sensor 22 includes various sensors to detect driving status of the vehicle 10. For example, the vehicle sensor 22 includes a vehicle speed sensor, a yaw rate sensor, a torque sensor, etc. The vehicle speed sensor can measure wheel speed of the vehicle 10 in a conventional manner to detect current vehicle speed of the vehicle 10. The yaw rate sensor detects the yaw rate generated in the vehicle 10 in a conventional manner. The torque sensor can measure the torque on the crankshaft of the vehicle engine 14 in a conventional manner. The driving status of the vehicle 10 detected by the vehicle sensor 22 can be used to collect driving status data, as will be further described below.

In the illustrated embodiment, the vehicle 10 includes a vehicle actuator 24. The vehicle actuator 24 is operatively connected to the processor 16 to operate vehicle components of the vehicle 10 according to the autonomous driving control and/or the driving assist control. Specifically, the vehicle actuator 24 includes a steering actuator, a brake control actuator, etc. The steering actuator operates the steering device of the vehicle 10 to control the steering angle of the vehicle 10. The brake control actuator operates the braking device to control the deceleration of the vehicle 10. In the illustrated embodiment, the processor 16 can be in communication with the ECM of the vehicle engine 14 to operate the vehicle engine 14 to control the acceleration of the vehicle 10. However, the vehicle actuator 24 can further include an accelerator opening actuator that operates the throttle of the vehicle engine 14 to control the acceleration of the vehicle 10.

In the illustrated embodiment, the vehicle 10 includes a satellite navigation device 26. The satellite navigation device 26 includes a global navigation satellite system (GNSS) receiver. In the illustrated embodiment, the GNSS receiver can be a global positioning system (GPS) receiver, for example. The satellite navigation device 26 receives radio waves from a plurality of navigation satellites to obtain information that represents, for example, a current vehicle heading of the vehicle 10, a current vehicle position of the vehicle 10 in two or three dimensions, a current vehicle angular orientation of the vehicle 10, or a combination thereof.

In the illustrated embodiment, the vehicle 10 includes a wireless communicator 28. The wireless communicator 28 is in wireless communications to a remote processing system or server 30 via a wireless network 32, such as a cellular network, a satellite communication, etc. The wireless communicator 28 is a hardware device capable of transmitting and/or receiving an analog or digital signal wirelessly via an antenna. The terms "wireless communicator" as used herein include a receiver, a transmitter, a transceiver, or a transmitter-receiver, for example.

In the illustrated embodiment, the vehicle 10 can be further equipped with any other vehicle components, such as a user interface with a display screen that is configured to display various information to the driver. In the illustrated embodiment, the processor 16, the computer memory 18, the environmental sensor 20, the vehicle sensor 22, the vehicle actuator 24, the satellite navigation device 26 and the wireless communicator 28 forms the vehicle control system 12 of the vehicle 10.

In the illustrated embodiment, the map annotation system 100 also includes the remote server 30. In the illustrated embodiment, the remote server 30 includes a cloud server system with a virtualized server that operates in a remote data center and is accessible over the wireless network 32. In the illustrated embodiment, the remote server 30 includes a processor or electronic controller 34. The remote server 30 also includes a computer memory 36. The remote server 30 also includes a communicator or communication interface 38. Referring to FIG. 1, the remote server 30 is illustrated as a single physical computer or server with the processor 34, the computer memory 36 and the communication interface 38. However, the remote server 30 (or the functions of the processor 34, the computer memory 36 and the communication interface 38) can be implemented through a network of physical computers or servers. Thus, in the illustrated embodiment, the remote server (e.g., the remote processing system) is remotely provided relative to the vehicle 10, and the remote server includes the processor 34.

The processor 34 includes one or more electronic processing units for performing the various functionality of the map annotation system 100, as will be further described. In the illustrated embodiment, the processor 34 is preferably one or more microcomputers (MPUs) or central processing units (CPUs). The processor 34 is formed of one or more semiconductor chips that are mounted on a circuit board. The term "processor" or "electronic controller" as used herein refers to hardware that executes a software program, and does not include a human being. The MPU or CPU may be one or more integrated circuits having firmware for causing the circuitry to complete the activities described herein. Of course, any number of other analog and/or digital components capable of performing the functionality described below can be provided in place of, or in conjunction with the processor 34.

The computer memory 36 is any memory or storage device. Here, for example, the computer memory 36 includes a transitory or non-transitory computer-readable medium with the sole exception of a transitory propagating signal. Thus, the computer memory 36 can include nonvolatile memory and volatile memory, and can include at least one of an internal memory, or other type of memory devices such as a read-only memory (ROM), an erasable programmable read only memory (EPROM), an electrically erasable programmable read-only memory (EEPROM), a random access memory (RAM), a hard disk, a flash drive, etc. The computer memory 36 stores various control processes or control programs as well as information or data used by the processor 34. Thus, the computer memory 36 is electrically connected to the processor 34. In this way, the processor 34 can retrieve data and access programs stored in the computer memory 34, and can store data to the computer memory 34. As explained below, the computer memory 34 preferably includes non-volatile memory that is configured to store various control programs, operational data, component identification data, etc.

The communication interface 38 includes a network interface or hardware that allows the remote server 30 to connect to the wireless network 32. The communication interface 38 is configured to at least receive data from the vehicle 10 over the wireless network 32. The communication interface 38 can be in various forms, including Ethernet ports, wireless network adapters, etc.

In the illustrated embodiment, other vehicles V other than the vehicle 10 can participate the map annotation system 100. In this case, the vehicles V can include various vehicle components similar to those of the vehicle 10.

Figure 2:
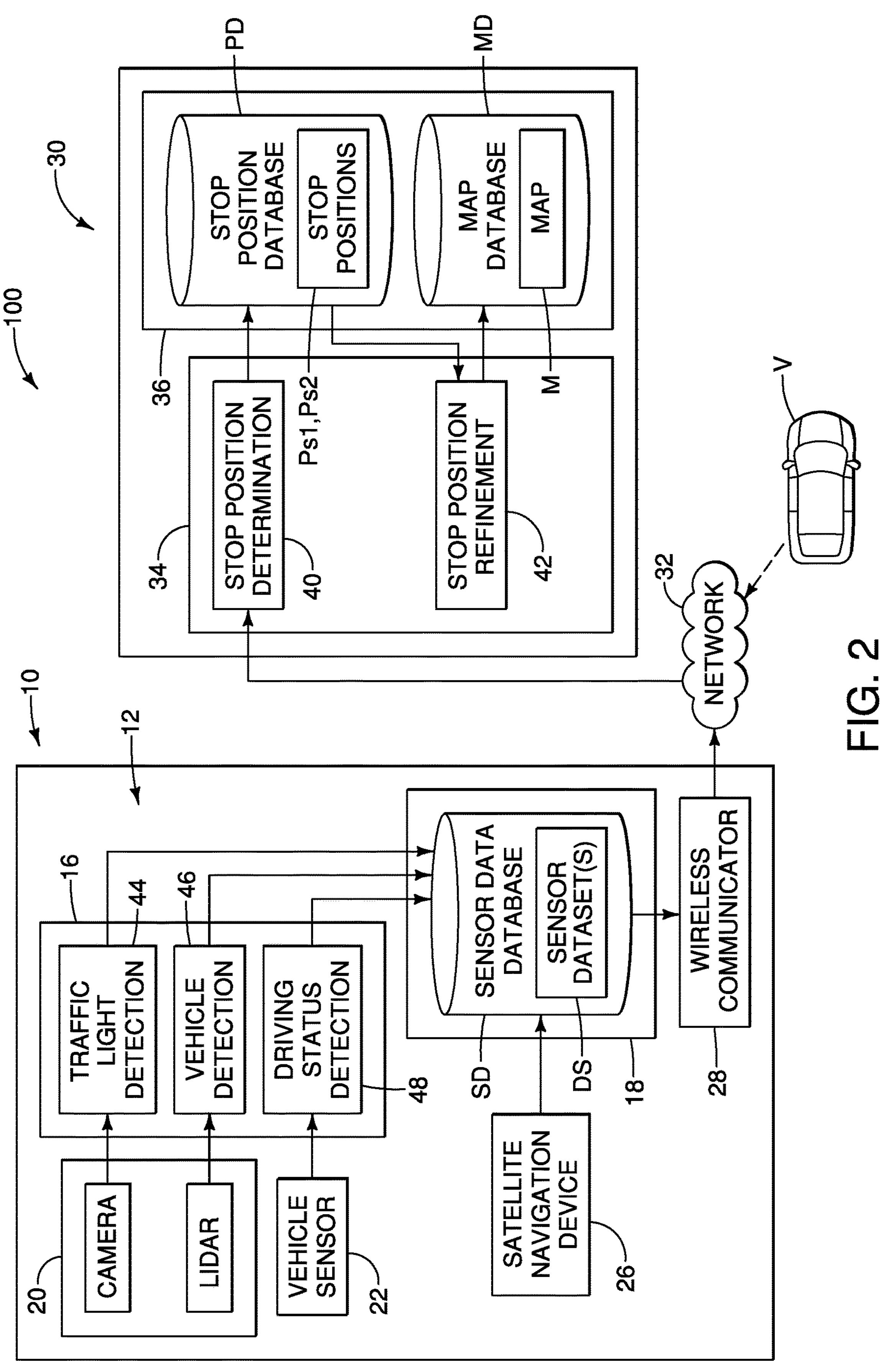
FIG. 2 is a functional block diagram showing a stop position mapping of the map annotation system illustrated in FIG. 1.

FIG. 2 illustrates a functional block diagram of a stop position mapping (e.g., a vehicle stop position determination method) performed by the map annotation system 100 in accordance with the present disclosure. In the illustrated embodiment, the stop position mapping includes a stop position determination 40 for determining a stop position for a road intersection, and a stop position refinement 42 for determining an optimal or preferred stop position (e.g., a vehicle stop position) for the road intersection and annotating or labeling the optimal stop position for the road intersection on a digital map. In the illustrated embodiment, the processor 34 of the remote server 30 performs the stop position determination 40 and the stop position refinement 42 based on sensor data collected by the vehicle 10.

Referring to FIG. 2, the sensor data collected by the vehicle 10 will be described in detail. In the illustrated embodiment, the computer memory 18 of the vehicle 10 includes sensor data database SD that stores the sensor data collected by the environmental sensor 20, the vehicle sensor 22 and the satellite navigation device 26 of the vehicle 10. Specifically, in the illustrated embodiment, the sensor data collected by the environmental sensor 20, the vehicle sensor 22 and the satellite navigation device 26 of the vehicle 10 is time-series or time-stamped data, and is stored in the sensor data database SD as a sensor dataset DS in which the time-stamped sensor data are associated with each other according to the timestamp. In the illustrated embodiment, the sensor dataset DS includes traffic light detection data (e.g., traveling environment data), vehicle detection data (e.g., traveling environment data), driving status detection data (e.g., driving status data) and vehicle position data (e.g., position data) that are associated with each other according to the timestamp. In other words, the computer memory 18 provided to the vehicle 10 stores the traffic light detection data (e.g., traveling environment data), the vehicle detection data (e.g., traveling environment data) and the driving status detection data (e.g., driving status data) associated with the vehicle position data (e.g., position data) of the vehicle 10.

Figure 3:
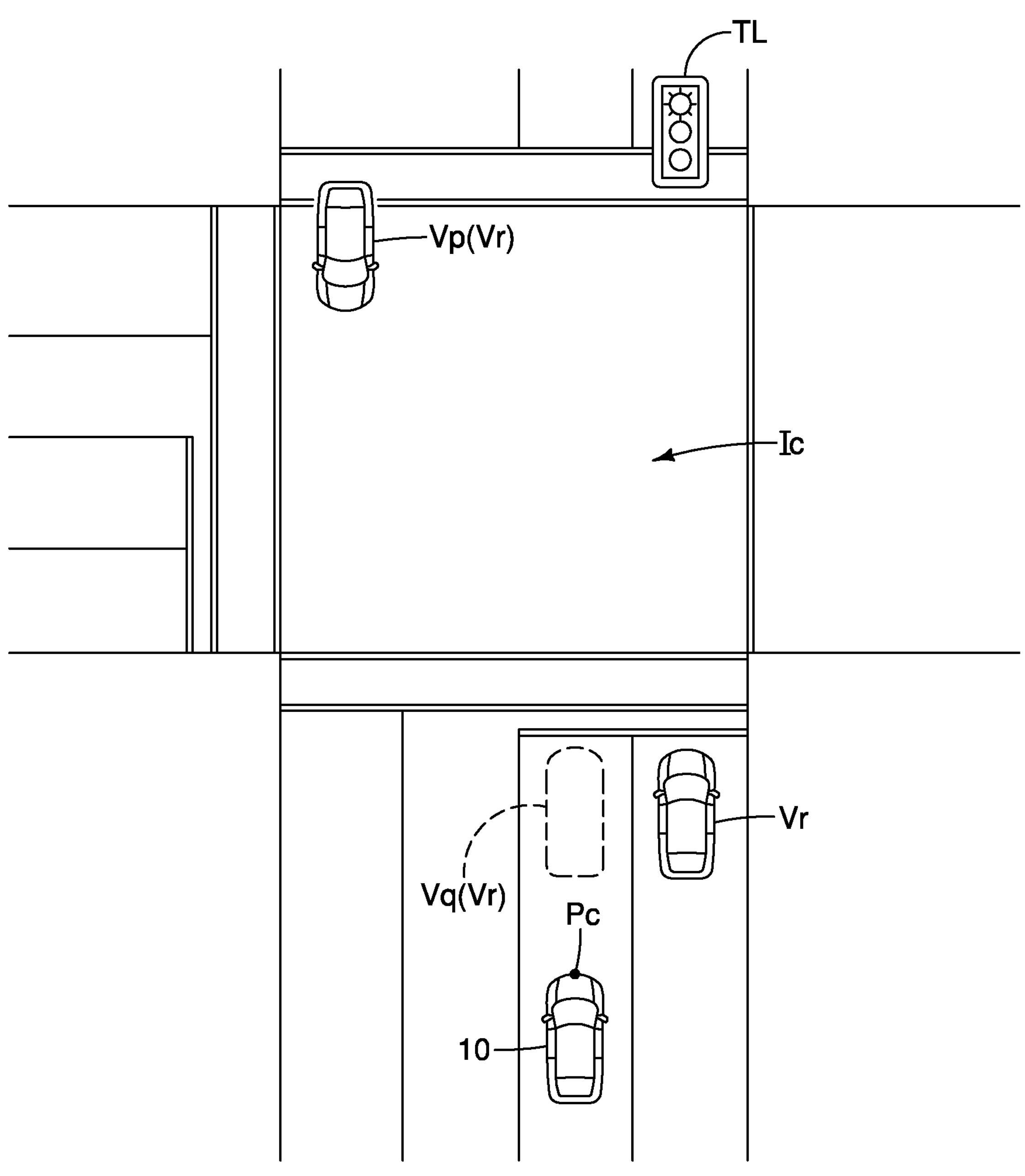
FIG. 3 is a schematic diagram showing a traveling environment of the vehicle illustrated in FIG. 1.

Referring now to FIG. 3, the sensor data of the sensor dataset DS will be further explained. The traffic light detection data indicates the color of a traffic light TL ahead of the vehicle 10. In the illustrated embodiment, the environmental sensor 20 detects the traffic light TL ahead of the vehicle 10 to determine the color of the traffic light TL. For example, the camera of the environmental sensor 20 continuously captures images of the surroundings, including traffic lights TL while the vehicle 10 is traveling. Then, the processor 16 of the vehicle 10 performs a traffic light detection 44 to identify the color of the traffic light TL based on the detection result of the environmental sensor 20. Specifically, the processor 16 processes the captured images to identify and classify various objects including traffic lights TL in a conventional manner. Once a traffic light TL is detected in the image, the processor 16 analyzes the portion of the image corresponding to the traffic light TL to determine the color of the traffic light TL. For example, the processor 16 examines brightness, hue, and/or saturation levels of the portion of the image to identify whether the color of the traffic light TL is red, green, or yellow. Of course, the processor 16 can also rely on other sensors, such as the Lidar, the radar sensor, etc., in addition to the camera to ensure accurate perception of traffic lights TL. Then, the processor 16 stores the detection result of the traffic light detection 44 (i.e., the color of the traffic light TL) in the sensor data database SD as the time-stamped traffic light detection data.

The vehicle detection data indicates the presence or absence of an oncoming vehicle Vp and the presence or absence of a leading vehicle Vq. In the illustrated embodiment, the environmental sensor 20 continuously gathers data about the surroundings of the vehicle 10. In particular, in the illustrated embodiment, the environmental sensor 20 detects an oncoming vehicle Vp traveling toward the vehicle 10 and a leading vehicle Vq in front of the vehicle 10. For example, the Lidar of the environmental sensor 20 continuously outputs point cloud of the surroundings of the vehicle 10 while the vehicle 10 is traveling. Then, the processor 16 of the vehicle 10 performs a vehicle detection 46 to identify the oncoming vehicle Vp and the leading vehicle Vq based on the detection result of the environmental sensor 20. Specifically, the processor 16 processes the point cloud to identify and classify various objects including neighboring vehicles Vr in a conventional manner. Once a neighboring vehicle Vr is detected, the processor 16 tracks movements or behavior of the neighboring vehicle Vr over time. For example, the processor 16 detects the movements or behavior of the neighboring vehicle Vr from consecutive Lidar point cloud and estimates the position, the speed, the trajectory, etc., of the neighboring vehicle Vr. Furthermore, the processor 16 classifies the neighboring vehicle Vr as the oncoming vehicle Vp or the leading vehicle Vq based on the relative position, the relative speed, the relative trajectory, etc., of the neighboring vehicle Vr relative to the vehicle 10. The leading vehicle Vq is typically found in the same direction of travel relative to the vehicle 10 and in front of the vehicle 10, while the oncoming vehicle Vp is typically found in the opposite direction of travel relative to the vehicle 10 and in front of the vehicle 10. Of course, the processor 16 can also rely on other sensors, such as the camera, the radar sensor, etc., in addition to the Lidar to ensure accurate perception of neighboring vehicles Vr (e.g., leading vehicles Vq or oncoming vehicles Vp). Then, the processor 16 stores the detection result of the vehicle detection 46 (i.e., the presence or absence of the oncoming vehicle Vp and the presence or absence of the leading vehicle Vq) in the sensor data database SD as the time-stamped vehicle detection data.

The driving status detection data indicates the driving status of the vehicle 10. In the illustrated embodiment, the vehicle sensor 22 collects driving status data of the vehicle 10, such as the current vehicle speed of the vehicle 10. In the illustrated embodiment, the vehicle speed sensor continuously gathers data about the current vehicle speed of the vehicle 10 while the vehicle 10 is traveling. Then, the processor 16 of the vehicle 10 performs a driving status detection 48 to identify the driving status of the vehicle 10 based on the detection result of the vehicle sensor 22. Specifically, the processor 16 process the data from the vehicle sensor 22 to determine whether the vehicle 10 is moving or stopping. Then, the processor 16 stores the detection result of the driving status detection 48 (i.e., the driving status (moving status or stopping status) of the vehicle 10) in the sensor data database SD as the time-stamped driving status detection data.

The vehicle position data indicates the current vehicle position Pc of the vehicle 10. In the illustrated embodiment, the satellite navigation device 26 outputs the current vehicle position Pc of the vehicle 10. The current vehicle position Pc of the vehicle 10 is stored in the sensor data database SD as the time-stamped vehicle position data. In the illustrated embodiment, other data from the satellite navigation device 26 can also be stored in the sensor data database SD, such as the current vehicle heading of the vehicle 10, the current vehicle angular orientation of the vehicle 10, etc.

As mentioned above, the traffic light detection data, the vehicle detection data, the driving status detection data and the vehicle position data are associated with each other according to the timestamp and are stored in the sensor data database SD as the sensor dataset DS. The wireless communicator 28 of the vehicle 10 transmits the sensor dataset DS to the remote server 30 via the network 32. Thus, in the illustrated embodiment, the wireless communicator 28 wirelessly transmits the traffic light detection data (e.g., traveling environment data), the vehicle detection data (e.g., traveling environment data) and the driving status detection data (e.g., driving status data) associated with the vehicle position data (e.g., position data) of the vehicle 10 to the remote server 30.

In the illustrated embodiment, the wireless communicator 28 transmits the sensor dataset DS to the remote server 30 at a predetermined timing or interval or in response to a request from the remote server 30. For example, the wireless communicator 28 can transmits the sensor dataset DS to the remote server 30 each time new sensor dataset DS is stored in the sensor data database SD, each time a predetermined amount of sensor datasets DS are stored in the sensor data database SD, each time a predetermined time period elapses. The wireless communicator 28 also can transmit the sensor dataset DS to the remote server 30 each time the processor 16 determines that the vehicle 10 is stopping based on the driving status detection data. In this case, the driving status detection data does not need to be included in the sensor dataset DS and be transmitted to the remote server 30. Of course, the sensor dataset DS stored in the sensor data database SD may include additional data in addition to those exemplified above.

Figure 4:
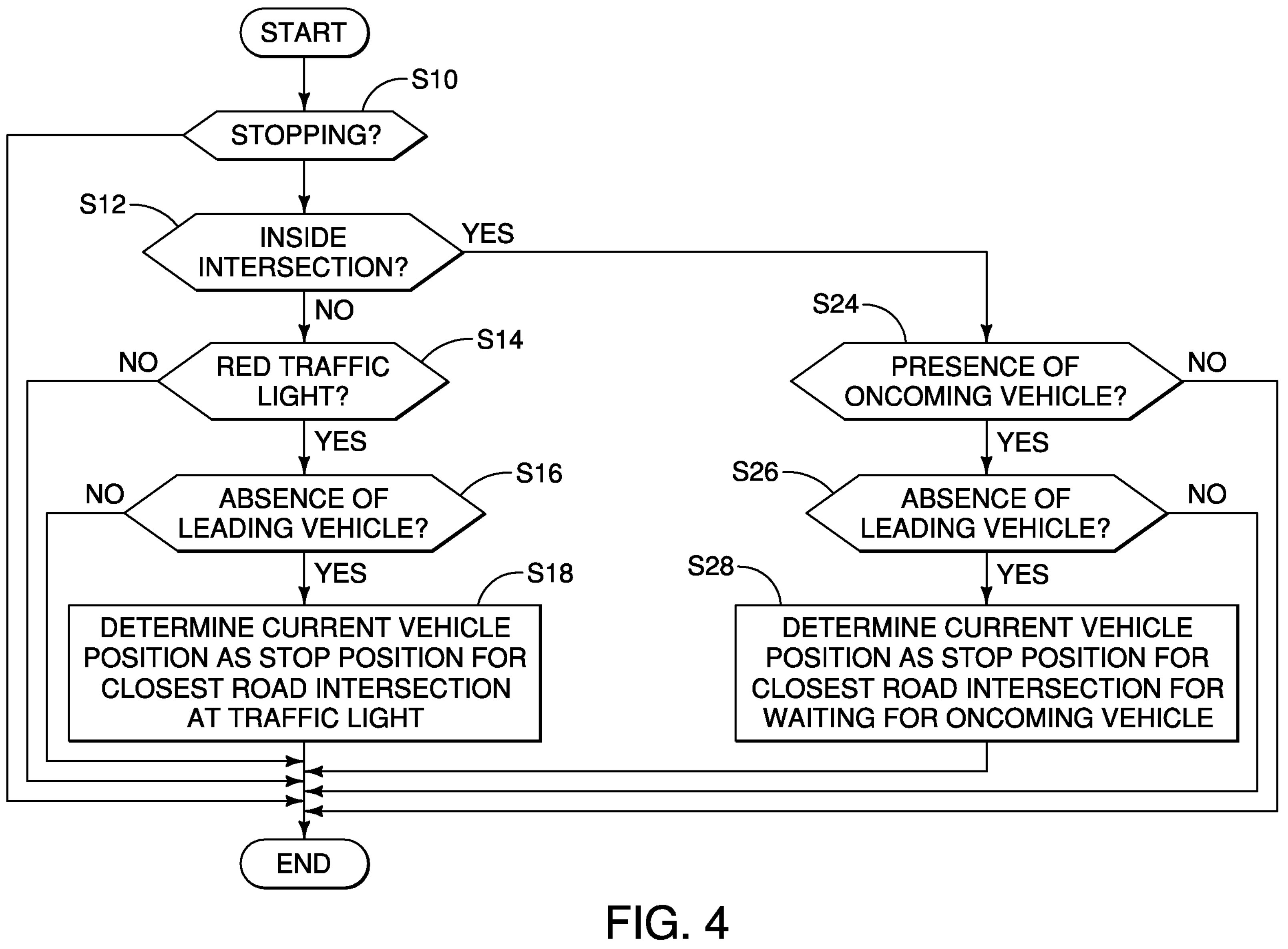
FIG. 4 is a flow chart of a stop position determination by the map annotation system.

Referring to FIG. 4, the stop position determination 40 of the present disclosure will be described. In the stop position determination 40, the processor 34 of the remote server 30 acquires the sensor dataset DS transmitted from the vehicle 10 and analyze or parse the sensor dataset DS from the vehicle 10. When the processor 34 acquires a plurality of sensor datasets DS (i.e., a predetermined amount of sensor datasets DS) from the vehicle 10, the processor 34 repeats the stop position determination 40 for each of the sensor datasets DS.

In the illustrated embodiment, the processor 34 first determines that the driving status detection data of the sensor dataset DS indicates a "stopping status" that is indicative of the vehicle 10 being stopping (step S10). If the processer 34 determines that the driving status detection data of the sensor dataset DS does not indicate the "stopping status" and indicates a "moving status" that is indicative of the vehicle 10 being moving ("NO" in step S10), then the processor 34 ends the stop position determination 40 based on the sensor dataset DS.

If the processer 34 determines that the driving status detection data of the sensor dataset DS indicates the "stopping status" ("YES" in step S10), then the processor 34 determines whether the current vehicle position Pc of the vehicle position data of the sensor dataset DS is located inside or within a road intersection Ic (step S12). Specifically, the processor 34 identifies the closest road intersection closest to the current vehicle position Pc from digital map data of a map M stored in a map database MD of the computer memory 36 of the remote server 30, and then the processor 34 determines whether the current vehicle position Pc is located inside the road intersection Ic by determining whether the current vehicle position Pc is located inside the closest road intersection.

More specifically, in the illustrated embodiment, the map M of the map database MD includes the so-called HD (High Definition) map that have detailed road structure, such as lane-level geometry, road boarders and guardrails, lane connectivity, etc., in addition to road data that represents road networks with map nodes and map links. The map nodes each indicate a point or location on the map M, representing a road intersection or a junction. The map links each indicate a connection or path between two map nodes on the map M, representing road segments that connect different locations on the map M. The map database MD stores the map nodes and the map links in association with their specific positions or geographic coordinates (e.g., GPS coordinates). The processor 34 identifies the closest road intersection closest to the current vehicle position Pc by comparing the current vehicle position Pc with the GPS coordinates of the map nodes, for example. Then, the processor 34 determines boundaries of the closest road intersection that define the closest road intersection therewithin from the detailed road structure of the closest road intersection based on the map M of the map database MD. In this case, the map M of the map database MD pre-stores GPS coordinates of the boundaries of road intersections as the detailed road structure. However, the processor 34 can determine the boundaries of the closest road intersection in different manner, as needed and/or desired. For example, the processor 34 can calculate boundaries of the closest road intersection based on the digital map data of the map M of the map database MD by calculating an overlapping region or area of road segments that intersect at the closest road intersection. Furthermore, the processor 34 determines whether the current vehicle position Pc is located inside an area surrounded by the boundaries of the closest road intersection to determine whether the current vehicle position Pc is located inside the road intersection Ic.

Figure 5:
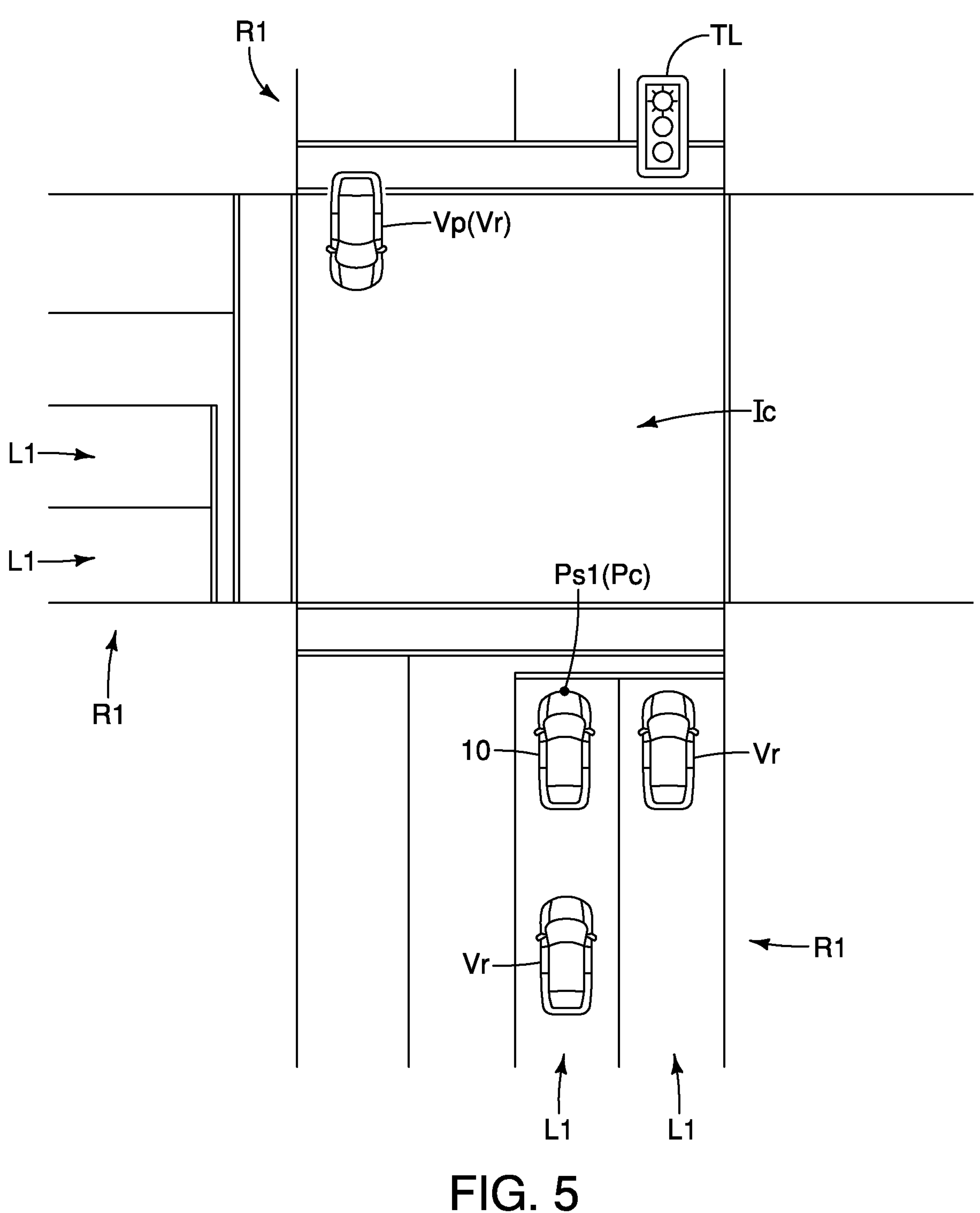
FIG. 5 is a schematic diagram showing a traveling environment of the vehicle when a stop position for waiting at a traffic light of a road intersection is determined.

If the processor 34 determines that the current vehicle position Pc is not located inside the road intersection Ic ("NO" in step S12), then the process proceeds to steps S14 to S18 for determining a stop position Ps1 for waiting at a traffic light TL of the road intersection Ic, as seen in FIG. 5.

Specifically, in step S14, the processor 34 determines whether the traffic light detection data of the sensor dataset DS indicates that the color of the traffic light TL is red. If the processor 34 determines that the traffic light detection data of the sensor dataset DS does not indicate that the color of the traffic light TL is red ("NO" in step S14), then the processor 34 ends the stop position determination 40 based on the sensor dataset DS.

On the other hand, if the processor 34 determines that the traffic light detection data of the sensor dataset DS indicates that the color of the traffic light TL is red ("YES" in step S14), then the processor 34 further determines whether the vehicle detection data of the sensor dataset DS indicates the absence of the leading vehicle Vq (step S16).

If the processor 34 determines that the vehicle detection data of the sensor dataset DS does not indicate the absence of the leading vehicle Vq or indicates the presence of the leading vehicle Vq ("NO" in step S16), as seen in a situation shown in FIG. 3, then the processor 34 ends the stop position determination 40 based on the sensor dataset DS.

On the other hand, if the processor 34 determines that the vehicle detection data of the sensor dataset DS indicates the absence of the leading vehicle Vq ("YES" in step S16), as seen in a situation shown in FIG. 5, then the processor 34 determines the current vehicle position Pc of the vehicle 10 as the stop position Ps1 for waiting at the traffic light TL of the road intersection Ic (step S18), and stores the stop position Ps1 for the road intersection Ic in a stop position database PD of the computer memory 36 of the remote server 30. Then, the processor 34 ends the stop position determination 40 based on the sensor dataset DS.

Thus, in the illustrated embodiment, in step S18, the processor 34 determines, as the stop position Ps1 for the road intersection Ic, the current vehicle position Pc (e.g., the position) of the vehicle 10 at a timing when the driving status detection data (e.g., the driving status data) indicates that the vehicle 10 is stopping ("YES" in step S10), the traffic light detection data (e.g., the traveling environment data) indicates a predetermined condition that the color of the traffic light TL is red ("YES" in step S14) and the vehicle detection data (e.g., the traveling environment data) indicates a predetermined condition that no leading vehicle Vq is present ("YES" in step S16) based on a relative position of the vehicle 10 relative to the road intersection Ic ("NO" in step S12). In particular, the predetermined conditions (S14 and S16) are determined based on whether the vehicle 10 is positioned inside the road intersection Ic (step S12). Thus, in the illustrated embodiment, a stop line of the road intersection Ic can be estimated without direct image processing of the stop line. In particular, the stop line of the road intersection Ic can be estimated by determining, as the stop position Ps1 for the road intersection Ic, the current vehicle position Pc of the vehicle 10 at the timing when the vehicle 10 stops at a red light and is at the very front of the queue of vehicles waiting for the red light. Specifically, in the illustrated embodiment, whether the vehicle 10 is at the very front of the queue of vehicles can be determined by determining whether a vehicle (i.e., the leading vehicle Vq) is present within a certain distance in front of the vehicle 10.

Figure 6:
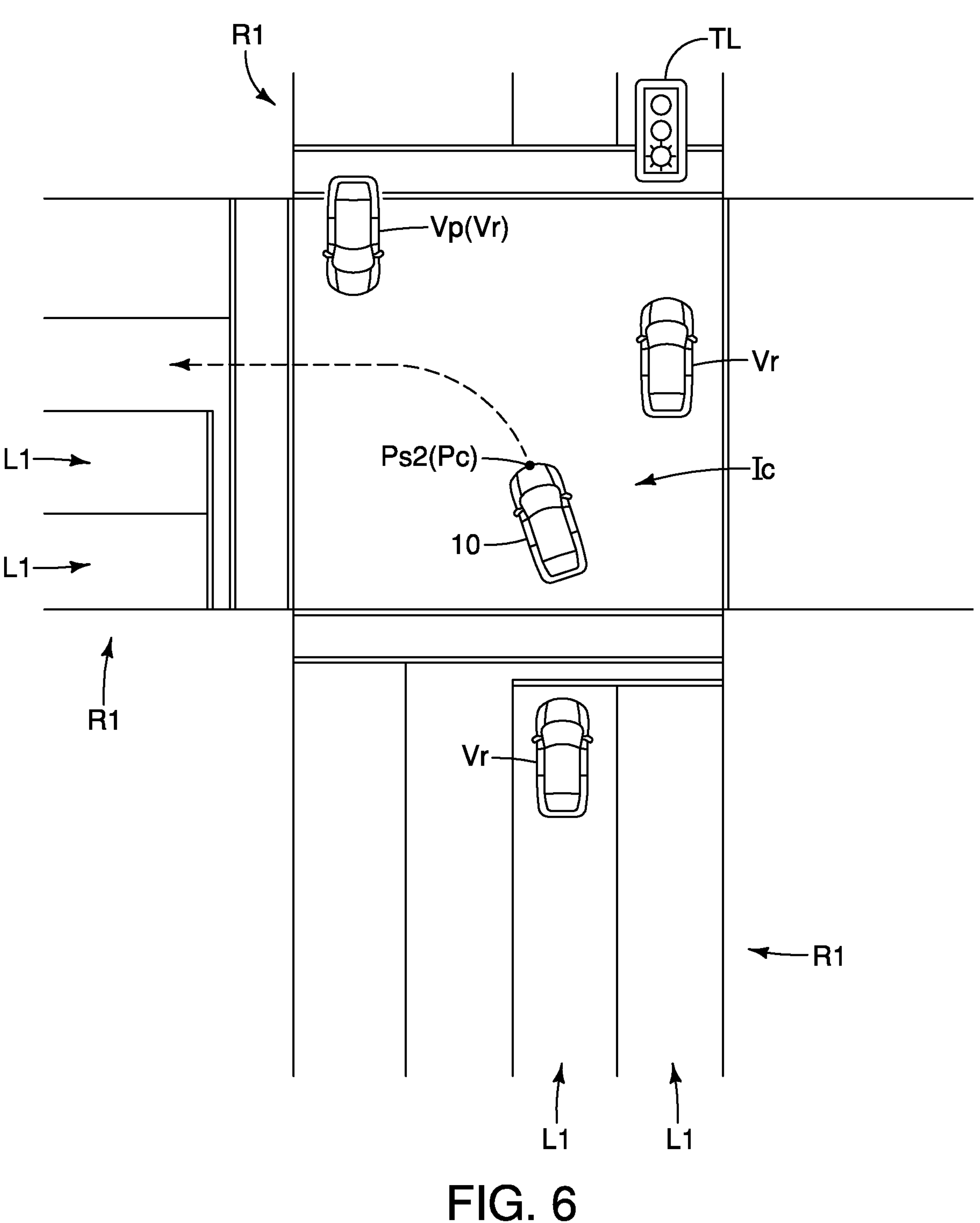
FIG. 6 is a schematic diagram showing a traveling environment of the vehicle when a stop position for waiting for an oncoming vehicle within the road intersection to turn is determined.

If the processor 34 determines that the current vehicle position Pc is located inside the road intersection Ic ("YES" in step S12), then the process proceeds to steps S24 to S28 for determining a stop position Ps2 for waiting for an oncoming vehicle Vp within the road intersection Ic to turn, as seen in FIG. 6.

Specifically, in step S24, the processor 34 determines whether the vehicle detection data of the sensor dataset DS indicates the presence of the oncoming vehicle Vp.

If the processor 34 determines that the vehicle detection data of the sensor dataset DS does not indicate the presence of the oncoming vehicle Vp or indicates the absence of the oncoming vehicle Vp ("NO" in step S24), then the processor 34 ends the stop position determination 40 based on the sensor dataset DS.

On the other hand, if the processor 34 determines that the vehicle detection data of the sensor dataset DS indicates the presence of the oncoming vehicle Vp ("YES" in step S24), as seen in a situation shown in FIG. 6, then the processor 34 further determines whether the vehicle detection data of the sensor dataset DS indicates the absence of the leading vehicle Vq (step S26).

If the processor 34 determines that the vehicle detection data of the sensor dataset DS does not indicate the absence of the leading vehicle Vq or indicates the presence of the leading vehicle Vq ("NO" in step S26), then the processor 34 ends the stop position determination 40 based on the sensor dataset DS.

On the other hand, if the processor 34 determines that the vehicle detection data of the sensor dataset DS indicates the absence of the leading vehicle Vq ("YES" in step S26), as seen in a situation shown in FIG. 6, then the processor 34 determines the current vehicle position Pc of the vehicle 10 as the stop position Ps2 for waiting an oncoming vehicle Vp within the road intersection Ic to turn (step S28), and stores the stop position Ps2 for the road intersection Ic in the stop position database PD of the computer memory 36 of the remote server 30. Then, the processor 34 ends the stop position determination 40 based on the sensor dataset DS.

Thus, in the illustrated embodiment, in step S28, the processor 34 determines, as the stop position Ps2 for the road intersection Ic, the current vehicle position Pc (e.g., the position) of the vehicle 10 at a timing when the driving status detection data (e.g., the driving status data) indicates that the vehicle 10 is stopping ("YES" in step S10), the vehicle detection data (e.g., the traveling environment data) indicates a predetermined condition that the oncoming vehicle Vp is present ("YES" in step S24) and the vehicle detection data (e.g., the traveling environment data) indicates a predetermined condition that no leading vehicle Vq is present ("YES" in step S26) based on a relative position of the vehicle 10 relative to the road intersection Ic ("YES" in step S12). In particular, the predetermined conditions (S24 and S26) are determined based on whether the vehicle 10 is positioned inside the road intersection Ic (step S12). Thus, in the illustrated embodiment, a stop line of the road intersection Ic can be estimated without direct image processing of the stop line. In particular, even if there are not stop lines within the road intersection Ic, a stop line or position can be estimated by determining, as the stop position Ps2 for the road intersection Ic, the current vehicle position Pc of the vehicle 10 at the timing when the oncoming vehicle Vp is present and the vehicle 10 is at the very front of the queue of vehicles waiting for the oncoming vehicle Vp. Specifically, in the illustrated embodiment, whether the vehicle 10 is at the very front of the queue of vehicles can be determined by determining whether a vehicle (i.e., the leading vehicle Vq) is present within a certain distance in front of the vehicle 10.

In the illustrated embodiment, the stop position Ps1 determined in step S18 and/or the stop position Ps2 determined in step S28 can be utilized for the stop position mapping without being processed in the stop position refinement 42. Specifically, after the stop position Ps1 is determined in step S18 and/or the stop position Ps2 determined in step S28, the processor 34 can annotate or label the stop position Ps1 and/or the stop position Ps2 for the road intersection Ic on the digital map data of the map M stored in the map database MD of the computer memory 36. For example, the processor 34 can add a virtual stop line on the digital map data of the map M based on the stop position Ps1 and/or the stop position Ps2.

In the illustrated embodiment, with the stop position determination 40, the stop position Ps1 shown in FIG. 5 and the stop position Ps2 shown in FIG. 6 are determined relative to the same road intersection Ic, but they are stored as different or separate entries or records in the stop position database PD of the computer memory 36.

Furthermore, with the stop position determination 40, when different approach roads R1 lead into the road intersection Ic, as seen in FIG. 5, various stop positions Ps1 for waiting at different traffic lights of the road intersection Ic will be determined relative to the same road intersection Ic. In this case, the stop positions Ps1 are stored as different or separate entries or records in the stop position database PD of the computer memory 36 that are associated with the approach roads R1, respectively. In short, with the stop position determination 40, different stop positions Ps1 can be determined for different approach roads R1, respectively, and be stored as different or separate entries or records in the stop position database PD of the computer memory 36, respectively.

Moreover, with the stop position determination 40, when each approach road R1 includes a plurality of lanes L1, as seen in FIG. 5, various stop positions Ps1 for waiting at the same traffic light TL of the road intersection Ic will be determined relative to the same road intersection Ic. In this case, the stop positions Ps1 are stored as different or separate entries or records in the stop position database PD of the computer memory 36 that are associated with the lanes L1, respectively. In short, with the stop position determination 40, different stop positions Ps1 can be determined for different lanes L1 of each approach roads R1, respectively, and be stored as different or separate entries or records in the stop position database PD of the computer memory 36, respectively.

Similarly, with the stop position determination 40, when different approach roads R1 lead into the road intersection Ic, as seen in FIG. 6, various stop positions Ps2 for waiting for an oncoming vehicle within the road intersection Ic will be determined relative to the same road intersection Ic. In this case, the stop positions Ps2 are stored as different or separate entries or records in the stop position database PD of the computer memory 36 that are associated with the approach roads R1, respectively. In short, with the stop position determination 40, different stop positions Ps2 can be determined for different approach roads R1, respectively, and be stored as different or separate entries or records in the stop position database PD of the computer memory 36, respectively.

Moreover, with the stop position determination 40, when each approach road R1 includes a plurality of lanes L1, as seen in FIG. 6, various stop positions Ps2 for waiting for an oncoming vehicle within the road intersection Ic will be determined relative to the same road intersection Ic. In this case, the stop positions Ps2 are stored as different or separate entries or records in the stop position database PD of the computer memory 36 that are associated with the lanes L1, respectively. In short, with the stop position determination 40, different stop positions Ps2 can be determined for different lanes L1 of each approach roads R1, respectively, and be stored as different or separate entries or records in the stop position database PD of the computer memory 36, respectively.

Figure 7:
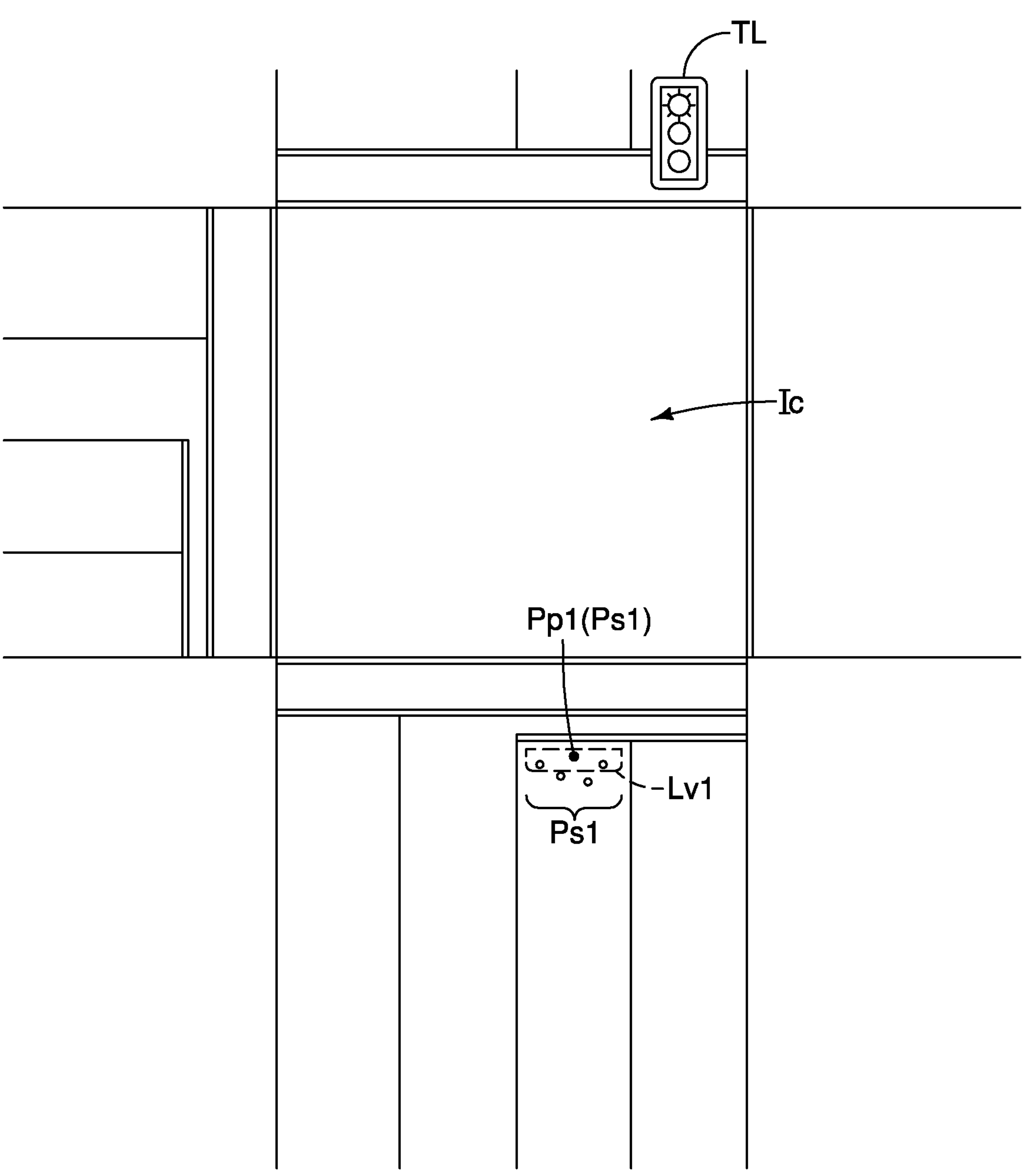
FIG. 7 is a schematic diagram showing a stop position refinement of stop positions for waiting at a traffic light of a road intersection by the map annotation system.
Figure 8:
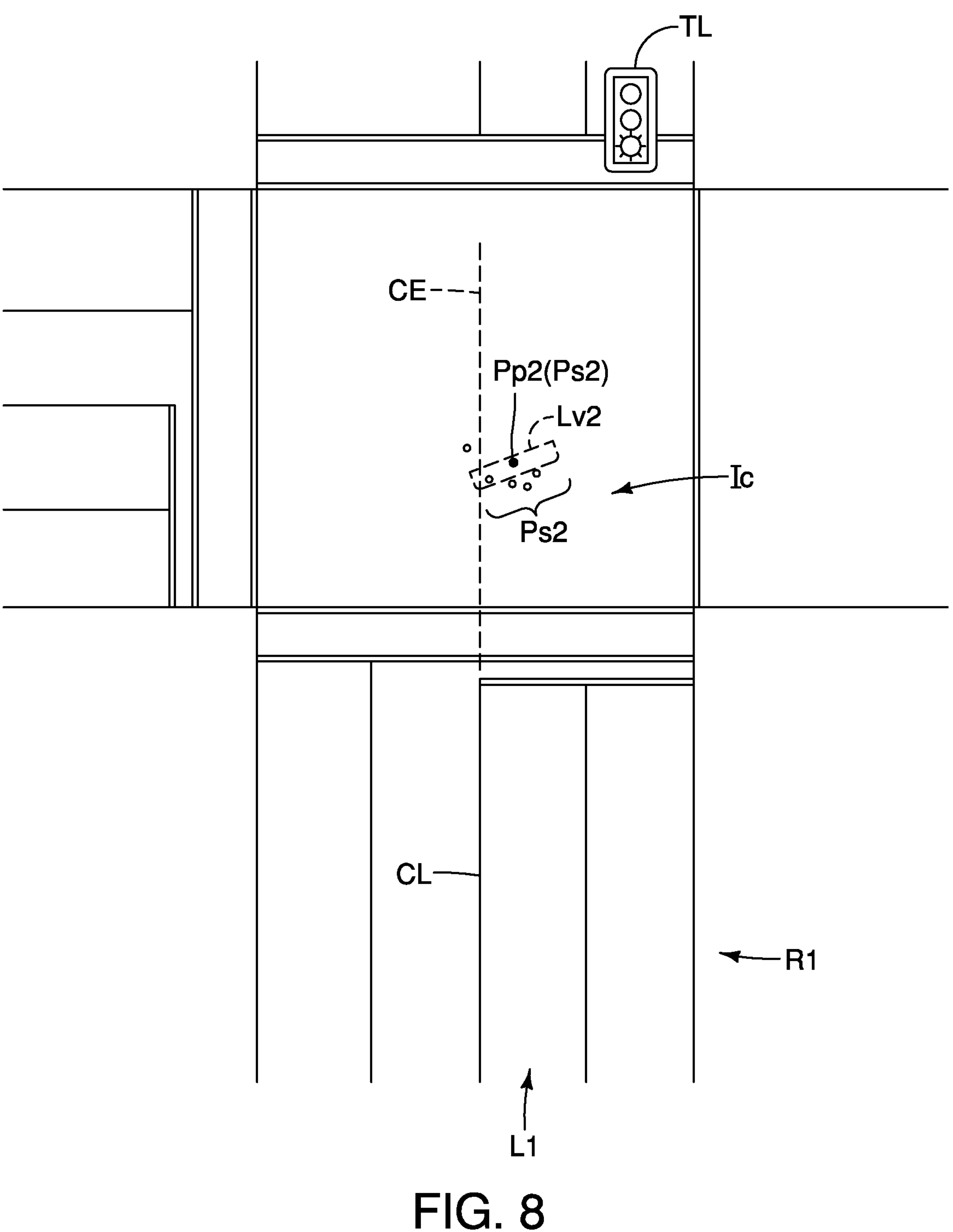
FIG. 8 is a schematic diagram showing a stop position refinement of stop positions for waiting for an oncoming vehicle within a road intersection by the map annotation system.
Figure 9:
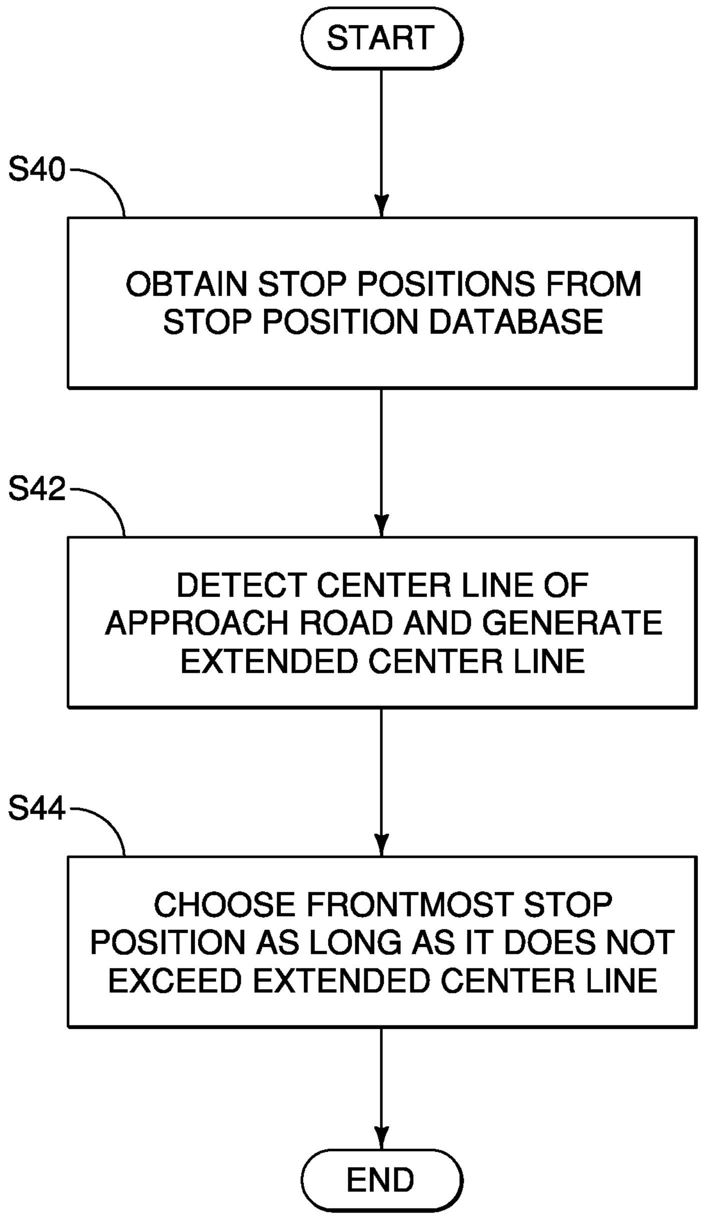
FIG. 9 is a flow chart of the stop position refinement of the stop positions for waiting for an oncoming vehicle within the road intersection by the map annotation system.

Referring now to FIGS. 7 to 9, the stop position refinement 42 will be described in detail. First, referring to FIG. 7, the stop position refinement 42 for stop positions Ps1 for waiting at the same traffic light TL of the road intersection Ic will be described. In the illustrated embodiment, while the vehicle 10 and/or the vehicles V are traveling over time, different stop positions Ps1 for waiting at the same traffic light TL of the road intersection Ic will be generated relative to the same road intersection Ic based on different sensor datasets DS obtained from the vehicle 10 and/or the vehicles V at different points in time, respectively, as seen in FIG. 7. In this case, they can be stored as the same or single entry or record in the stop position database PD of the computer memory 36. In other words, the computer memory 36 stores the stop positions Ps1 for the road intersection Ic, and the stop positions Ps1 are at least partially determined by the processor 34 of the vehicle 10.

Furthermore, an optimal or preferred stop position Pp1 for waiting at the traffic light TL of the road intersection Ic can be determined based on the stop positions Ps1 through the stop position refinement 42. For example, with the stop position refinement 42 for the stop positions Ps1, the processor 34 of the remote server 30 obtains the stop positions Ps1 stored as the same or single entry or record in the stop position database PD of the computer memory 36 from the stop position database PD. In the illustrated embodiment, as seen in FIG. 7, the processor 34 chooses one of the stop positions Ps1 that is located at the frontmost position in the direction of travel (i.e., the closest position to the road intersection Ic) as the optimal stop position Pp1 for the road intersection Ic. Of course, the processor 34 can choose different one of the stop positions Ps1 based on different criteria. Furthermore, the processor 34 can determine the optimal stop position Pp1 by calculating a representative value, such as an average, a middle value, etc., based on the stop positions Ps1.

Then, in the illustrated embodiment, the processor 34 annotates or labels the optimal stop position Pp1 for the road intersection Ic on the digital map data of the map M stored in the map database MD of the computer memory 36. For example, the processor 34 add a virtual stop line Lv1 on the digital map data of the map M based on the optimal stop position Pp1 for the road intersection Ic, as seen in FIG. 7. The digital map data of the map M can be distributed from the remote server 30 to the vehicle 10 for the autonomous driving control or the driving assist control by the vehicle control system 12 of the vehicle 10, for example. Thus, in the illustrated embodiment, the computer memory 36 stores the digital map data (e.g., the digital map), and the processor 34 updates the digital map data stored in the computer memory 36 by annotating the optimal stop position Pp1 for the road intersection Ic.

Next, referring to FIGS. 8 and 9, the stop position refinement 42 for stop positions Ps2 for waiting for an oncoming vehicle within the road intersection Ic will be described. In the illustrated embodiment, while the vehicle 10 and/or the vehicles V are traveling over time, different stop positions Ps2 for waiting for an oncoming vehicle within the road intersection Ic will be generated relative to the same road intersection Ic based on different sensor datasets DS obtained from the vehicle 10 and/or the vehicles V at different points in time, respectively, as seen in FIG. 8. In this case, they can be stored as the same or single entry or record in the stop position database PD of the computer memory 36. In other words, the computer memory 36 stores the stop positions Ps2 for the road intersection Ic, and the stop positions Ps2 are at least partially determined by the processor 34 of the vehicle 10.

Furthermore, an optimal or preferred stop position Pp2 for waiting for an oncoming vehicle within the road intersection Ic can be determined based on the stop positions Ps2 through the stop position refinement 42. For example, as seen in FIG. 9, with the stop position refinement 42 for the stop positions Ps2, the processor 34 of the remote server 30 obtains the stop positions Ps2 stored as the same or single entry or record in the stop position database PD of the computer memory 36 from the stop position database PD (step S40). Then, the processor 34 detects a center line CL of the approach road R1 (or a boundary line CL of the lane L1) based on the digital map data of the map M stored in the map database MD, and generate an extended center line CE that is an extension of the center line CL extending inside the road intersection Ic (step S44). Furthermore, the processor 34 determines one of the stop positions Ps2 that is located at the frontmost position in the direction of travel as long as it is not positioned past the extended center line CE, and then chooses the one of the stop positions Ps2 as the optimal stop position Pp1 for the road intersection Ic (step S44). Of course, the processor 34 can choose different one of the stop positions Ps2 based on different criteria. Furthermore, the processor 34 can determine the optimal stop position Pp2 by calculating a representative value, such as an average, a middle value, etc., based on the stop positions Ps2.

Then, in the illustrated embodiment, the processor 34 annotates or labels the optimal stop position Pp2 for the road intersection Ic on the digital map data of the map M stored in the map database MD of the computer memory 36. For example, the processor 34 add a virtual stop line Lv2 on the digital map data of the map M based on the optimal stop position Pp2 for the road intersection Ic, as seen in FIG. 8. The digital map data of the map M can be distributed from the remote server 30 to the vehicle 10 for the autonomous driving control or the driving assist control by the vehicle control system 12 of the vehicle 10, for example. Thus, in the illustrated embodiment, the computer memory 36 stores the digital map data (e.g., the digital map), and the processor 34 updates the digital map data stored in the computer memory 36 by annotating the optimal stop position Pp1 for the road intersection Ic.

In the illustrated embodiment, the map annotation system 100 includes the remote server 30 with the processor 34 that processes the sensor dataset DS obtained from the vehicle 10 through the network 32. With this configuration, other vehicles V can also participate the map annotation system 100 through the network 32. Thus, with the map annotation system 100, it becomes easier to collect sensor data from different vehicles, which makes the determinations of the optimal stop positions Pp1 and Pp2 more accurate and reliable.

In the illustrated embodiment, an example is shown in which the map annotation system 100 includes the vehicle 10 and the remote server 30. However, the configuration of the map annotation system 100 is not limited to this. For example, all or some of the functions and/or configurations of the remote server 30 can be provided to the vehicle 10, as seen in FIGS. 10 and 11.

Figure 10:
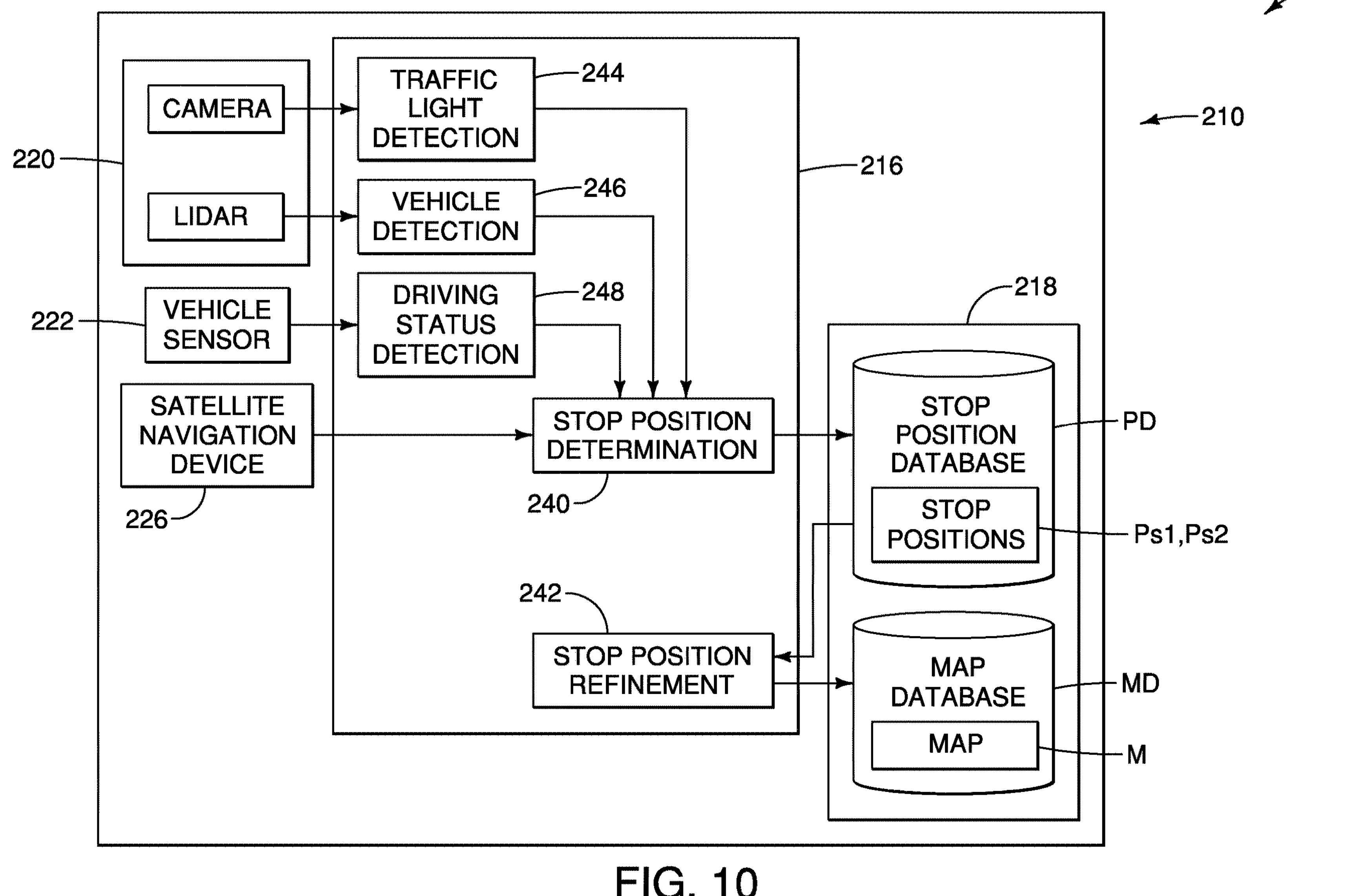
FIG. 10 is a functional block diagram showing a stop position mapping of a map annotation system in accordance with another embodiment.
Figure 11:
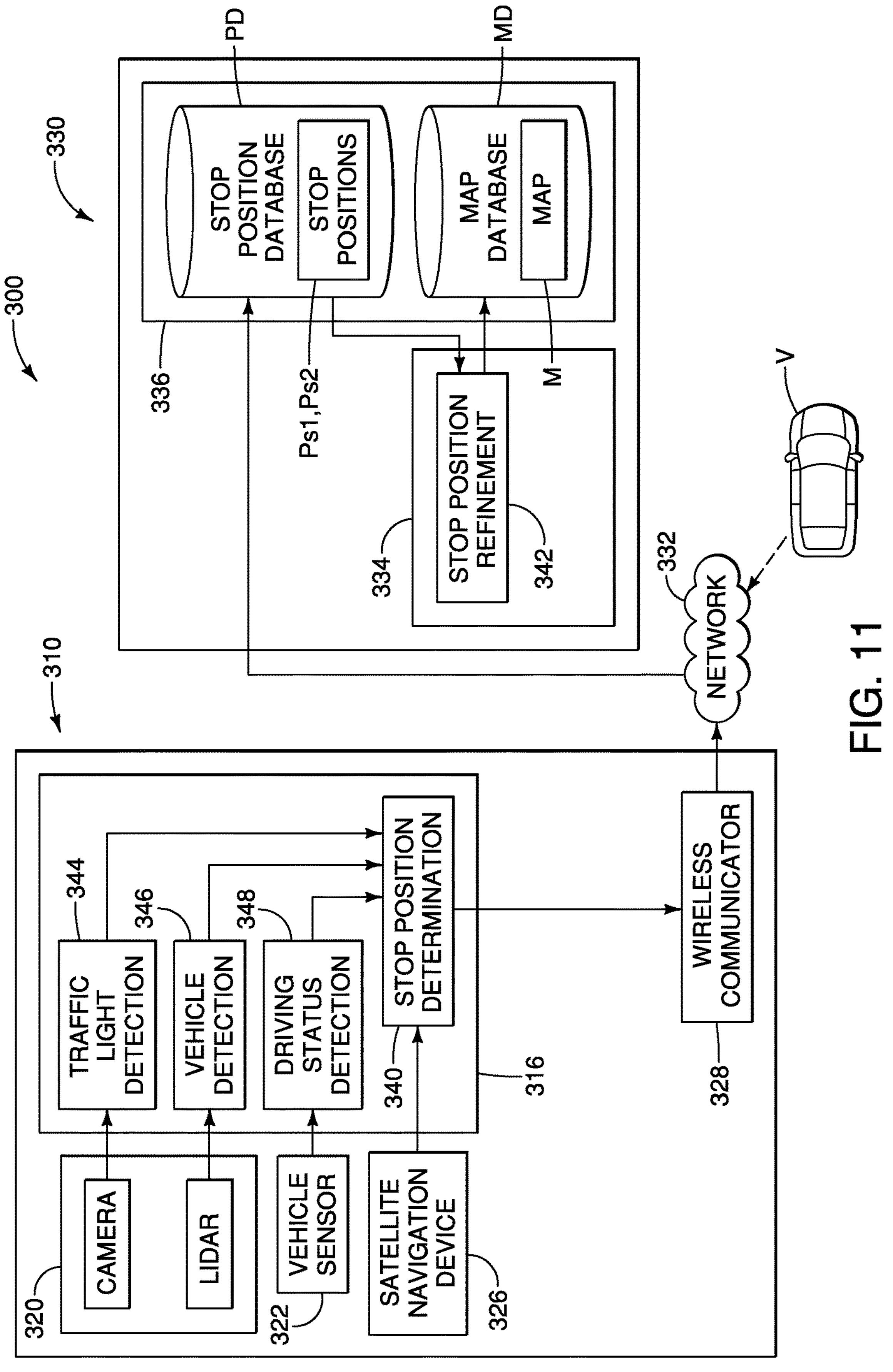
FIG. 11 is a functional block diagram showing a stop position mapping of a map annotation system in accordance with yet another embodiment.

Referring to FIG. 10, a map annotation system 200 in accordance with another embodiment of the present disclosure will be described. The map annotation system 200 includes a vehicle 210, but does not include a remote server. The vehicle 210 is provided with all of the functions and/or configurations of the remote server 30 shown in FIG. 2. In particular, the vehicle 210 is basically identical to the vehicle 10 shown in FIG. 1, and includes at least a processor 216, a computer memory 218, an environmental sensor 220, a vehicle sensor 222 and a satellite navigation device 226, as seen in FIG. 10. The environmental sensor 220, the vehicle sensor 222 and the satellite navigation device 226 of the vehicle 210 are identical to the environmental sensor 20, the vehicle sensor 22 and the satellite navigation device 26 of the vehicle 10, and thus will not be described in detail for the sake of brevity.

Furthermore, the processor 216 of the vehicle 210 is also basically identical to the processor 16 of the vehicle 10, except that the processor 216 additionally performs a stop position determination 240 and a stop position refinement 242. Specifically, as seen in FIG. 10, the processor 216 performs a traffic light detection 244, a vehicle detection 246 and a driving status detection 248 that are identical to the traffic light detection 44, the vehicle detection 46 and the driving status detection 48 of the processor 16, respectively. Thus, the traffic light detection 244, the vehicle detection 246 and the driving status detection 248 will not be described in detail for the sake of brevity. In the illustrated embodiment, the processor 216 performs the traffic light detection 244 to identify the color of the traffic light TL based on the detection result of the environmental sensor 220. The processor 216 also performs the vehicle detection 246 to identify the oncoming vehicle Vp and the leading vehicle Vq based on the detection result of the environmental sensor 220. Furthermore, the processor 216 performs the driving status detection 248 to identify the driving status of the vehicle 210 based on the detection result of the vehicle sensor 222.

In the illustrated embodiment, the stop position determination 240 and the stop position refinement 242 of the processor 216 are also basically identical to the stop position determination 40 and the stop position refinement 42 of the processor 34 of the remote server 30, respectively. However, in the illustrated embodiment, the stop position determination 240 performs the processes shown in FIG. 4 based on the detection results of the traffic light detection 244, the vehicle detection 246 and the driving status detection 248 (i.e., the traffic light detection data, the vehicle detection data and the driving status detection data) and the detection result of the current vehicle position of the vehicle 210 output by the satellite navigation device 226 (i.e., the vehicle position data), instead of using the traffic light detection data, the vehicle detection data, the driving status detection data and the vehicle position data that are stored in the sensor data database SD. Thus, in the illustrated embodiment, the stop position determination 240 can be performed using real-time sensor data.

Of course, in the illustrated embodiment, the vehicle 210 can be configured such that the computer memory 218 stores the sensor data database SD in which the traffic light detection data, the vehicle detection data, the driving status detection data and the vehicle position data that are associated with each other according to the timestamp are stored as the sensor dataset DS. In other words, the computer memory 218 provided to the vehicle 210 stores the traffic light detection data (e.g., traveling environment data), the vehicle detection data (e.g., traveling environment data) and the driving status detection data (e.g., driving status data) associated with the vehicle position data (e.g., position data) of the vehicle 210. In this case, the stop position determination 240 performed by the processor 216 can be identical to the stop position determination 40 performed by the processor 34 of the remote server 30.

In the illustrated embodiment, the computer memory 218 is basically identical to the computer memory 18 of the vehicle 10, except that the computer memory 218 does not include the sensor data database SD and includes the stop position database PD and the map database MD. In other words, the computer memory 218 is basically identical to the computer memory 36 of the remote server 30. Thus, the computer memory 218 stores the stop positions Ps1 for the road intersection Ic, and the stop positions Ps1 are at least partially determined by the processor 216 of the vehicle 210. Furthermore, the computer memory 218 stores the stop positions Ps2 for the road intersection Ic, and the stop positions Ps2 are at least partially determined by the processor 216 of the vehicle 210.

However, as mentioned above, the computer memory 218 can store any additional data or database, such as the sensor data database SD.

In the illustrated embodiment, the vehicle 210 can be provided with all of the functions and/or configurations of the remote server 30 illustrated in FIG. 2. Thus, the vehicle 210 is configured to perform the stop position mapping of the map annotation system 200 by itself. In particular, the vehicle 210 can perform the stop position mapping using real-time sensor data.

Referring further to FIG. 11, a map annotation system 300 in accordance with yet another embodiment of the present disclosure will be described. The map annotation system 300 includes a vehicle 310 and a remote server 330. The vehicle 310 is provided with some or part of the functions and/or configurations of the remote server 30 shown in FIG. 2. In particular, the vehicle 310 is basically identical to the vehicle 10 shown in FIG. 1, and includes at least a processor 316, an environmental sensor 320, a vehicle sensor 322, a satellite navigation device 326 and a wireless communicator 328, as seen in FIG. 11. The environmental sensor 320, the vehicle sensor 322 and the satellite navigation device 326 of the vehicle 310 are identical to the environmental sensor 20, the vehicle sensor 22 and the satellite navigation device 26 of the vehicle 10, and thus will not be described in detail for the sake of brevity.

Furthermore, the processor 316 of the vehicle 310 is also basically identical to the processor 16 of the vehicle 10, except that the processor 316 additionally performs a stop position determination 340. Specifically, as seen in FIG. 11, the processor 316 performs a traffic light detection 344, a vehicle detection 346 and a driving status detection 348 that are identical to the traffic light detection 44, the vehicle detection 46 and the driving status detection 48 of the processor 16, respectively. Thus, the traffic light detection 344, the vehicle detection 346 and the driving status detection 348 will not be described in detail for the sake of brevity. In the illustrated embodiment, the processor 316 performs the traffic light detection 344 to identify the color of the traffic light TL based on the detection result of the environmental sensor 320. The processor 316 also performs the vehicle detection 346 to identify the oncoming vehicle Vp and the leading vehicle Vq based on the detection result of the environmental sensor 320. Furthermore, the processor 316 performs the driving status detection 348 to identify the driving status of the vehicle 310 based on the detection result of the vehicle sensor 322.

In the illustrated embodiment, the stop position determination 340 of the processor 316 is also basically identical to the stop position determination 40 of the processor 34 of the remote server 30. However, in the illustrated embodiment, the stop position determination 340 performs the processes shown in FIG. 4 based on the detection results of the traffic light detection 344, the vehicle detection 346 and the driving status detection 348 (i.e., the traffic light detection data, the vehicle detection data and the driving status detection data) and the detection result of the current vehicle position of the vehicle 310 output by the satellite navigation device 326 (i.e., the vehicle position data), instead of using the traffic light detection data, the vehicle detection data, the driving status detection data and the vehicle position data that are stored in the sensor data database SD. Thus, in the illustrated embodiment, the stop position determination 340 can be performed using real-time sensor data.

Of course, in the illustrated embodiment, the vehicle 310 can further be provided with a computer memory that is basically identical to the computer memory 18 of the vehicle 10. In this case, the computer memory of the vehicle 310 can store the sensor data database SD in which the traffic light detection data, the vehicle detection data, the driving status detection data and the vehicle position data that are associated with each other according to the timestamp are stored as the sensor dataset DS. In this case, the stop position determination 340 performed by the processor 316 can be identical to the stop position determination 40 performed by the processor 34 of the remote server 30.

In the illustrated embodiment, the wireless communicator 328 is basically identical to the wireless communicator 28 of the vehicle 10, except that the wireless communicator 328 transmits the determination result of the stop position determination 340 (i.e., the stop position Ps1 and/or the stop position Ps2) to the remote server 330 via the network 32 at a predetermined timing or interval or in response to a request from the remote server 30. Thus, in the illustrated embodiment, the wireless communicator 328 is provided to the vehicle 310. The wireless communicator 328 wirelessly transmits the stop positions Ps1 and/or Ps2 determined by the processor 316 to the remote server 330.

In the illustrated embodiment, the remote server 330 is basically identical to the remote server 30 shown in FIG. 2, and includes at least a processor 334 and a computer memory 336, as seen in FIG. 11. The processor 334 of the remote server 330 is basically identical to the processor 34 of the remote server 30, except that the processor 334 does not perform a stop position determination. Thus, in the illustrated embodiment, the processer 334 performs a stop position refinement 342 that is identical to the stop position refinement 42 of the processor 34 of the remote server 30.

Furthermore, the computer memory 336 is identical to the computer memory 36 of the remote server 30. Thus, the computer memory 336 includes the stop position database PD and the map database MD. Specifically, in the illustrated embodiment, the stop position database PD stores the stop positions Ps1 and/or the stop positions Ps2 transmitted from the vehicle 310 and/or the vehicles V via the network 332. Thus, in the illustrated embodiment, the remote server 330 (e.g., the remote processing system) is remotely provided relative to the vehicle 310. The remote server 330 includes the computer memory 336 that stores the stop positions Ps1 and/or Ps2 for the road intersection Ic. The stop positions Ps1 and/or Ps2 are at least partially determined by the processor 316 of the vehicle 310. In the illustrated embodiment, the processor 334 of the remote server 330 determines the optimal stop position Pp1 for the road intersection Ic based on the stop positions Ps1 stored in the computer memory 336. Similarly, the processor 334 of the remote server 330 determines the optimal stop position Pp2 for the road intersection Ic based on the stop positions Ps2 stored in the computer memory 336.

In the illustrated embodiment, the vehicle 310 can be provided with some or part of the functions and/or configurations of the remote server 30 illustrated in FIG. 2. In particular, the processor 316 of the vehicle 310 performs the stop position determination 340 and only transmits the determination result of the stop position determination 340 to the remote server 330 via the network 332, which reduces the amount of data sent over the network 332 (data traffic).

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle (e.g., a host vehicle). Accordingly, these terms, as utilized to describe the present invention should be interpreted relative to a vehicle (e.g., a host vehicle).

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle stop position determination system comprising:

an environmental sensor configured to detect traveling environment of a host vehicle to collect traveling environment data;

a vehicle sensor configured to detect driving status of the host vehicle to collect driving status data;

a processor configured to determine, as a stop position for a road intersection, a position of the host vehicle at a timing when the driving status data indicates that the host vehicle is stopping and the traveling environment data indicates a predetermined condition based on a relative position of the host vehicle relative to the road intersection; and a computer memory configured to store stop positions for the road intersection to calculate an optimal stop position for the road intersection based on the stop positions stored in the computer memory, the stop positions being at least partially determined by the processor.

2. The vehicle stop position determination system according to claim 1, wherein the predetermined condition is determined based on whether the host vehicle is positioned inside the road intersection.

3. The vehicle stop position determination system according to claim 1, wherein the environmental sensor is configured to detect a traffic light ahead of the host vehicle, and the predetermined condition includes a condition that the color of the traffic light is red.

4. The vehicle stop position determination system according to claim 3, wherein the environmental sensor is further configured to detect a leading vehicle in front of the host vehicle, and the predetermined condition further includes a condition that no leading vehicle is present.

5. The vehicle stop position determination system according to claim 1, wherein the environmental sensor is configured to detect an oncoming vehicle traveling toward the host vehicle, and the predetermined condition includes a condition that the oncoming vehicle is present.

6. The vehicle stop position determination system according to claim 5, wherein the environmental sensor is further configured to detect a leading vehicle in front of the host vehicle, and the predetermined condition further includes a condition that no leading vehicle is present.

7. The vehicle stop position determination system according to claim 1, wherein the processor is configured to determine the optimal stop position for the road intersection by calculating an average of the stop positions stored in the computer memory.

8. The vehicle stop position determination system according to claim 1, wherein the processor is configured to determine the optimal stop position for the road intersection by choosing one of the stop positions stored in the computer memory.

9. The vehicle stop position determination system according to claim 1, wherein the computer memory is further configured to store a digital map, and the processor is further configured to update the digital map stored in the computer memory by annotating the optimal stop position for the road intersection.

10. The vehicle stop position determination system according to claim 1, wherein the computer memory is provided to the host vehicle, the computer memory being configured to store the traveling environment data and the driving status data associated with position data of the host vehicle.

11. The vehicle stop position determination system according to claim 10, further comprising a remote processing system remotely provided relative to the host vehicle, the remote processing system including the processor, and a wireless communicator provided to the host vehicle, the wireless communicator being configured to wirelessly transmit the traveling environment data and the driving status data associated with the position data of the host vehicle to the remote processing system.

12. The vehicle stop position determination system according to claim 1, wherein the environmental sensor, the vehicle sensor and the processor are provided to the host vehicle.

13. The vehicle stop position determination system according to claim 12, further comprising the computer memory is provided to the host vehicle.

14. The vehicle stop position determination system according to claim 12, further comprising a remote processing system remotely provided relative to the host vehicle, the remote processing system including the computer memory.

15. The vehicle stop position determination system according to claim 14, further comprising a wireless communicator provided to the host vehicle, the wireless communicator being configured to wirelessly transmit the stop position determined by the processor to the remote processing system.

16. The vehicle stop position determination system according to claim 14, wherein the remote processing system further includes a processor that is configured to determine the optimal stop position for the road intersection based on the stop positions stored in the computer memory.

17. A vehicle stop position determination method comprising:

detecting, by an environmental sensor, traveling environment of a host vehicle to collect traveling environment data;

detecting, by a vehicle sensor, driving status of the host vehicle to collect driving status data;

determining, by a processor, a position of the host vehicle at a timing when the driving status data indicates that the host vehicle is stopping and the traveling environment data indicates a predetermined condition based on a relative position of the host vehicle relative to a road intersection, as a stop position for the road intersection; and storing, by a computer memory, stop positions for the road intersection to calculate an optimal stop position for the road intersection based on the stop positions stored in the computer memory, the stop positions being at least partially determined by the processor.

* * * * *